United States Patent [19]
Gottlieb et al.

[11] Patent Number: 5,440,288
[45] Date of Patent: Aug. 8, 1995

[54] CONTROLLER FOR A BACKUP ALARM SYSTEM

[75] Inventors: Mark Gottlieb, Annandale; Harry Powell, Shipman, both of Va.

[73] Assignee: Design Tech International, Inc., Springfield, Va.

[21] Appl. No.: 286,208

[22] Filed: Aug. 5, 1994

[51] Int. Cl.⁶ .............................................. B60Q 1/22
[52] U.S. Cl. ................... 340/463; 340/474; 340/903
[58] Field of Search ............... 340/901, 902, 904, 435, 340/463, 474

[56] References Cited

U.S. PATENT DOCUMENTS

| | | | |
|---|---|---|---|
| 3,037,188 | 5/1962 | Weigl | 340/463 |
| 4,063,217 | 12/1977 | Hyde et al. | 340/463 |
| 4,803,488 | 2/1989 | Dombrowski | 340/903 |
| 5,047,747 | 9/1991 | Gottlieb | 340/463 |
| 5,132,665 | 7/1992 | Hutchisson et al. | 340/463 |
| 5,315,288 | 5/1994 | Coward | 340/463 |

FOREIGN PATENT DOCUMENTS 2635304  2/1990  France ................. 340/474

*Primary Examiner*—Brent Swarthout
*Attorney, Agent, or Firm*—Oblon, Spivak, McClelland, Maier & Neustadt

[57] ABSTRACT

The present invention is directed to a control system for a backup alarm. The system of the present invention allows an operator of a vehicle which employs a backup alarm warning system to either activate or deactivate the backup alarm warning system as desired. In the system of the present invention, if the vehicle operator places the vehicle in reverse a selected number of times, within a predetermined time period, then this can either activate or deactivate the backup alarm system.

18 Claims, 3 Drawing Sheets

CONTROLLER FOR A BACKUP ALARM SYSTEM

BACKGROUND OF THE INVENTION

1. Field of the Invention

The present invention is directed to a controller which can be used in a vehicle which has a backup alarm, to control when the backup alarm is activated and deactivated.

2. Discussion of the Background

Backup alarm systems are used in a wide variety of vehicles. Such backup alarm systems operate to warn pedestrians that a nearby vehicle is in reverse, to thereby provide a warning sound to pedestrians near the vehicle.

In some circumstances, however, it is desirable to eliminate the backup warning sound emitted by the backup alarm. An example of such a circumstance may be late at night in a residential environment. In this situation, an operator of a vehicle may not want a backup warning alarm to sound. In fact, in at least one country, England, it is against the law to operate such a backup alarm system after 10:00 p.m. Consequently, in England all vehicles which have a backup alarm must have a switch mounted in the driver's area that can control power to the backup alarm, to thereby deactivate the backup alarm by operation of the switch. However, mounting and wiring of such a switch is tedious and greatly increases the cost of installation of the backup alarm.

SUMMARY OF THE INVENTION

Accordingly, one object of the present invention is to provide a novel backup alarm controller which allows an operator to control whether the backup alarm mounted in a vehicle will emit the warning sound.

According to one feature of the present invention, a backup alarm controller of the present invention may detect the number of times that a vehicle is shifted into reverse, and based on the detected number of times that the vehicle is shifted into reverse, the backup alarm may either be activated or deactivated.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
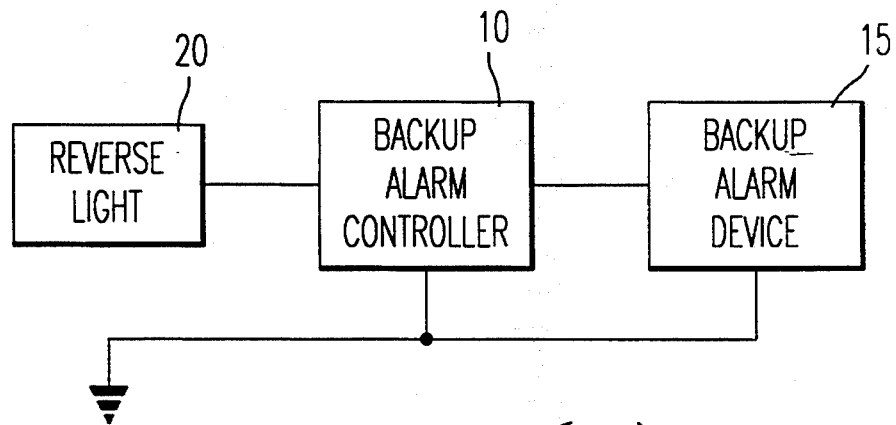
FIGS. 1(a) and 1(b) disclose the use of the backup alarm controller of the present invention in a vehicle system.
Figure 1B:
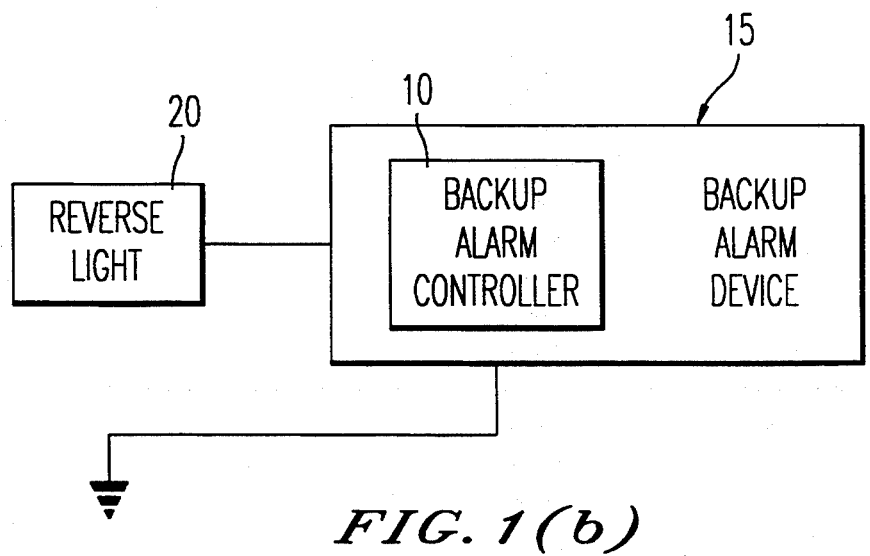

Referring now to the drawings, wherein like reference numerals designate identical or corresponding parts throughout the several views, and more particularly to FIGS. 1(a) and 1(b) thereof, there is shown a vehicle system which employs the backup alarm controller of the present invention.

According to the present invention, as shown in FIG. 1(a) a backup alarm device 15 is connected to a reverse light 20. In the embodiment shown in FIG. 1(a), the backup alarm controller 10 of the present invention is employed between the reverse light 20 and backup alarm device 15. The backup alarm controller 10 of the present invention operates to control the backup alarm device 15.

The backup alarm controller 10 of the present invention is a circuit which is capable of controlling power to the backup alarm 15. In operation, a vehicle operator puts the vehicle in reverse and a second later the backup alarm 15 begins normal operation to issue a warning sound. At this point, the vehicle operator may decide to control the emitting of the warning sound for whatever reason. If the operator of the vehicle does wish to control emitting of the warning sound, then the operator will put the vehicle in reverse, then pull the vehicle out of reverse, and then put the vehicle once again into reverse. This operation will supply power to the backup alarm for a brief period of time (a period of time which may not be long enough for the backup alarm to operate), then takes the power away from the backup alarm 15, and then resupplies power again to the backup alarm 15. This action of supplying power to the backup alarm 15, taking power away from the backup alarm 15, and then resupplying power to the backup alarm 15 causes the backup alarm controller 10 of the present invention to either activate or deactivate the backup warning device.

This operation in the present invention provides a significant advantage in that no designated switch and wire assembly is needed to run from the backup alarm device 15 into the cab of the vehicle, since the backup alarm controller 10 of the present invention will be mounted in series with the backup alarm power connection, or may actually be implemented as a part of the backup alarm device 15 itself, such as is shown in FIG. 1(b). Further, the backup alarm controller of the present invention may reset itself in about 3 seconds after the vehicle is taken out of reverse again.

Figure 2:
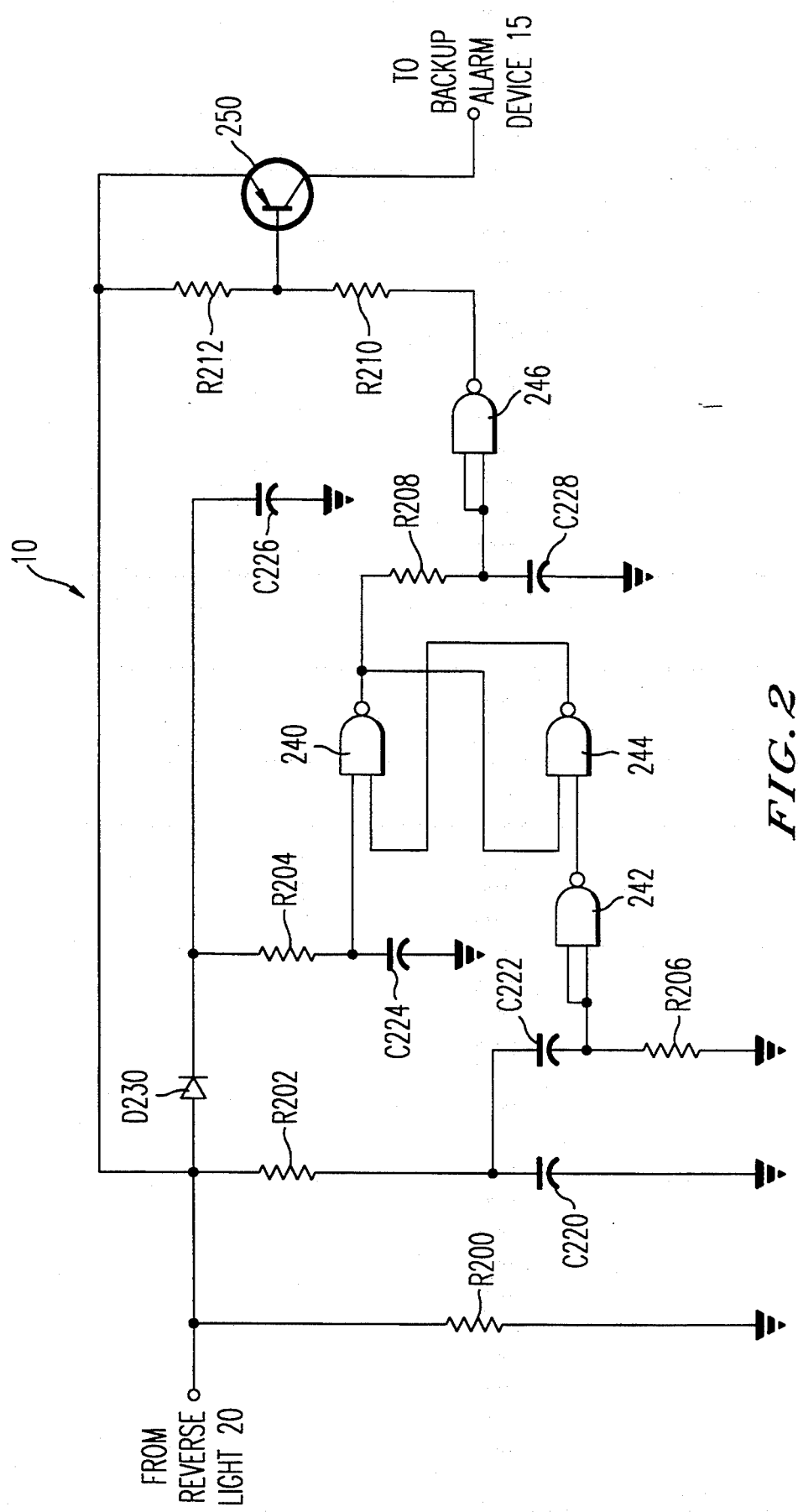
FIG. 2 discloses a first embodiment of the backup alarm controller of the present invention.

FIG. 2 discloses the specifics of a first embodiment of the backup alarm controller 10 according to the present invention. In this first embodiment of the present invention, the backup alarm will be activated unless an operator places the vehicle into reverse twice within a short period of time. If the vehicle is placed in reverse just a single time, then the backup alarm device 15 will operate to issue a warning. In effect, this operation in this first embodiment of the present invention requires an extra effort on the part of the vehicle operator to deactivate the backup alarm device 15.

As shown in FIG. 2 of the present specification, an input from the reverse light 20 is received. In parallel with this input is a resistor R200. Also, in parallel with this resistor R200 is a series combination of a resistor R202 and a capacitor C220. The input from the reverse light 20 is also fed through a diode D230 and through a capacitor C226 and then to ground. Connected to a point between the diode D230 and the capacitor C226 is a resistor R204 in series with a capacitor C224. An input to a NAND gate 240 is connected to a point between the resistor R204 and the capacitor C224. The output of this NAND gate 240 is fed through a resistor R208 and a capacitor C208 to ground.

Connected to a point between the resistor R202 and the capacitor C220 is a series circuit of a capacitor C222 and a resistor R206. Both inputs of a NAND gate 242 are connected to a point between the capacitor C222 and the resistor R206. The output of this NAND gate 242 is fed as one input into a further NAND gate 244. The output of this NAND gate 244 is also the second input to the NAND gate 240. Further, the second input into NAND gate 244 is the output of NAND gate 240.

A further NAND gate 246 is provided such that it has both of its inputs connected to a point between resistor R208 and capacitor C228, and NAND gate 246 operates as an inverter. Connected in series at the output of NAND gate 246 is a combination of a resistor R210 and a resistor R212. Connected to a point between the resistors R210 and the resistors R212 is a base of an output transistor 250. The collector of the output transistor 250 is also connected to resistor R212, and at a junction between resistor R202 and diode D230. The emitter of output transistor 250 is then fed to the backup alarm device 15.

This backup alarm controller shown in FIG. 2 of the present specification operates as follows. When the vehicle to which the backup alarm controller 10 is connected is put into reverse, power will be supplied from the reverse light 20. At this time, the input into the circuit shown in FIG. 2 of the present specification will be at a logical high. On this power-up situation, resistor R204 and capacitor C224 will provide a brief signal to NAND gate 240. The combination of NAND gate 240 and NAND gate 244 form a negative logic R-S flip-flop, with the input to NAND gate 240 through resistor R204 providing the R input and the output of NAND gate 242 providing the S input into this flip-flop circuit.

As noted above, when the vehicle is shifted into reverse and power is supplied from the reverse light 20, resistor R204 and capacitor C224 provide a short signal into the NAND gate 240, i.e., to the R input of the flip-flop. If resistor R204 has a value of 470 KΩ and capacitor C224 has a value of 1.0 MF, then this signal will have a duration of approximately 0.5 sec. As a result, the output of NAND gate 240, i.e., the output of the flip-flop, will be at a logical high. This thereby results in capacitor C228 being charged through resistor R208. After a predetermined time after capacitor C228 is charged, a high enough voltage will be supplied to the input of NAND gate 246 to cause the output of NAND gate 246 to be a logical low. This will thereby turn on transistor 250, which will thereby allow power to be supplied to the backup alarm so that the backup alarm will be operational.

If resistor R208 has a value of 1 MF and capacitor C228 has a value of 2.2 MF, then it will take approximately 2 seconds for the voltage at the input of NAND gate 246 to be a logical high, and which thereby turns on transistor 250.

In this way, in this embodiment of the present invention, if continuous power is supplied from the reverse light 20, the backup alarm will be powered.

However, in the operation of the device shown in FIG. 2 of the present specification, if power is temporarily interrupted from the reverse light 20, then a brief pulse is generated by resistors R202, R206 and capacitors C220, C222. This brief pulse will be input into NAND gate 242, so that the output of NAND gate 242 is a logical low. When resistors R202=47 KΩ, R206=470 KΩ, C220=0.2 MF, and C222=0.2 MF, then this brief pulse will have a duration of 20 msec. This thereby provides the effect that the input into the flip-flop formed by NAND gates 240 and 244 is a logical low, which thereby resets the flip-flop so that the output of NAND gate 240 is a logical low. As a result, the output of NAND gate 246 will be a logical high. This thereby turns off transistor 250, so that power is then not supplied to the backup alarm.

In this way, in this first embodiment of the present invention, if power is continuously supplied from reverse light 20, i.e., if the vehicle is only put into reverse a single time, then the backup alarm will have power supplied thereto and will issue a warning alarm. However, if the power from reverse light 20 is interrupted, i.e., if the vehicle is put into reverse twice within a predetermined period of time, then the backup alarm 15 connected to the backup alarm controller 10 of the present invention will not have power supplied thereto and will not operate.

other typical values for the other elements in FIG. 2 may be R200=1 KΩ, C226=100 MF, R210=10 KΩ, R212=10 KΩ.

Figure 3:
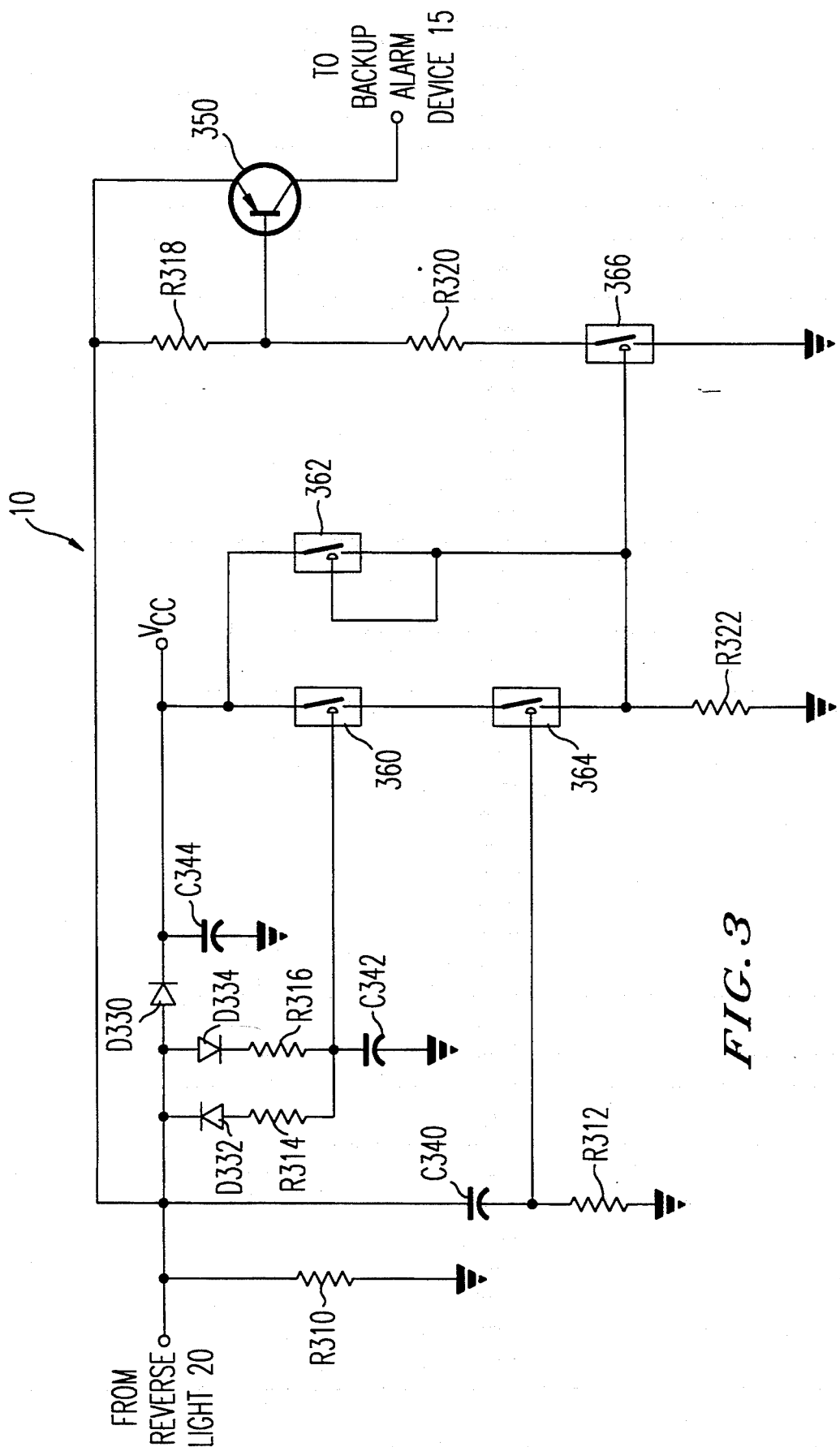
FIG. 3 discloses a second embodiment of the backup alarm controller of the present invention.

A second embodiment of the system of the present invention is shown in FIG. 3. In this second embodiment of the present invention, the output of the reverse light 20 is also the circuit input. Connected to this reverse light 20 is a diode D330, which has its output connected to a power supply source VCC, which may typically be 12 volts in a vehicle. Also connected between the reverse light input 20 and ground is a resistor R310. Also connected between the reverse light input 20 and ground, and in parallel with resistor R310, is a series connection of a capacitor C340 and a resistor R312. A point between this capacitor C340 and resistor R312 is connected as a control to a gate 364, which is typically a transmission gate.

Also connected to the reverse light input 20, and in parallel with diode D330, is a series combination of a diode D334, resistor R316, and capacitor C342. Connected between the reverse light input 20 and a point between the resistor R316 and capacitor C342 is a series circuit of a further diode D332 and a resistor R314. Also connected to this same point between resistor R316 and capacitor C342 is a control input of gate 360. The output of gate 360 is connected to the input of gate 364. The input of gate 360 is also connected to VCC. Also connected at the output of diode D330 and between ground is a capacitor C344.

A further gate 362 is also provided, which has its input connected to VCC, and which has its output and control input connected to the output of gate 364. Also connected to the output of gate 364 and between ground is a resistor R322. Further, a further gate 366 has its control input connected to the output of gates 364 and 362. The output of gate 366 is connected to ground. Connected to the input of gate 366 is a series combination of resistors R318 and R320. Resistor R318 is also in turn connected to the reverse light input 20.

An output transistor 350 is also provided. Output transistor 350 has its base connected to a point between resistor R318 and resistor R320. The collector of output transistor 350 is connected to the reverse light input 20. The emitter of transistor 350 serves as the input into the backup alarm device 15.

The second circuit arrangement of the present invention has an operation such that power must be supplied from the reverse light 20 at least twice within a predetermined period of time to supply power to the backup alarm device 15. In the circuit shown in FIG. 3 of the present specification, when the reverse light 20 is powered on, i.e., when the vehicle is put into reverse, capacitor C340 and resistor R312 provide a brief pulse to the control of gate 364. When capacitor C340 has a value of 0.1 MF and resistor R312 has a value of 10 KΩ, this brief pulse will have a duration of approximately 0.01 seconds. Resistor R316 and capacitor C342 provide a delayed signal to the control of gate 360. When resistor R316 has a value of 100 KΩ and capacitor C342 has a value of 1 MF, this delay may be approximately 0.1 seconds. This thereby closes gate 360. However, by the time gate 360 closes, gate 369 will again be opened, and thus gates 366 and 362 will also be opened, so transistor 350 will be off and no power will be supplied to the back-up alarm. Capacitor C344 is a storage capacitor which functions to provide continuous power (voltage) to the circuit so that it can remain alive between signals coming from the reverse light 20. Capacitor C344 may typically have a value of 100 MF. As noted above, at this point when power has only been supplied from the reverse light once, gate 366 will be open, and thereby transistor 350 will turned off, so that no power will be supplied to the backup alarm device 15 connected to this backup alarm control circuit 10.

If there is a break in power from the reverse light 20, and the circuit is energized a second time before resistor R314 discharges capacitor C342, then both gates 360 and 364 will be simultaneously activated and closed, which thereby provides a high signal across resistor R322, which thereby also closes gate 362. If resistor R314 has a value of 2.2 MΩ and capacitor C342 has a value of 1 MF, then this time within which power can again be supplied from reverse light 20 will be approximately 2 seconds. Resistors R310, R318, R320 and R322 may also typically have values of R310=1 KΩ, R318=10 KΩ, R320=10 KΩ, R322=10 KΩ.

In this situation, when each of gates 360, 362 and 364 are closed, this will then turn on (close) gate 366. This thereby provides a drive voltage to turn on transistor 350. When transistor 350 is turned on, then power will be supplied to the backup device alarm 15 connected thereto. Thus, in this operation of the present invention, power must be supplied from the reverse light 20 twice within a predetermined period of time before power will be supplied to the backup alarm device 15 connected to the backup alarm controller 10 shown in FIG. 3 of the present specification.

The various values provided for the circuitry shown in FIGS. 2 and 3 of the present specification are merely examples of circuit values which will provide an operational result. Clearly other circuit values can be employed in such backup control systems of the present invention. Also, as noted above, the backup controller 10 of the present invention 10 may be either a separate unit to be connected between the reverse light 20 and the backup alarm device 15 as shown in FIG. 1(a), or can be incorporated into the backup alarm device 15 itself, as shown in FIG. 1(b).

Obviously, numerous additional modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A backup alarm controller to be connected between a reverse light and a backup alarm device, comprising:
   a first circuit means for determining a number of times that the reverse light is powered within a predetermined period of time; and
   a second circuit means for controlling whether the backup alarm device is powered up based on the number of times that the reverse light is powered within the predetermined period of time as determined by the first circuit means, such that if the reverse light is powered a first predetermined number of times during the predetermined period of time, the backup alarm is powered up when the reverse light is powered, and if the reverse light is powered a second predetermined number of times during the predetermined period of time, the backup alarm is not powered up when the reverse light is powered.

2. The backup alarm controller according to claim 1, wherein the first circuit means comprises a control means for outputting a first signal when the reverse light is powered once during the predetermined period of time and for outputting a second signal when the reverse light is powered twice during the predetermined period of time.

3. The backup alarm controller according to claim 2, wherein the control means comprises a flip-flop.

4. The backup alarm controller according to claim 2, wherein the second circuit means comprises a transistor which supplies power to the backup alarm device when the first signal is output by the first circuit means and which cuts off power to the backup alarm device when the second signal is output by the first circuit means.

5. The backup alarm controller according to claim 1, wherein the first circuit means comprises a switching control means which is open when the reverse light is powered once during the predetermined period of time and which is closed when the reverse light is powered twice during the predetermined period of time.

6. The backup alarm controller according to claim 5, wherein the second circuit means comprises a transistor which supplies power to the backup alarm device when the switching control means is closed and which cuts off power to the backup alarm device when the switching control means is open.

7. A backup alarm controller to be used in a vehicle comprising:
   an input to a reverse light of the vehicle;
   first circuitry for determining a number of times that the reverse light is powered within a predetermined period of time; and
   second circuitry for controlling whether a backup alarm is powered up based on the number of times that the reverse light is powered within the predetermined period of time as determined by the first circuitry, such that if the reverse light is powered a first predetermined number of times during the predetermined period of time, the backup alarm is powered UP when the reverse light is powered, and if the reverse light is powered a second predetermined number of times during the predetermined period of time, the backup alarm is not powered up when the reverse light is powered.

8. The backup alarm controller according to claim 7, wherein the first circuitry comprises a control circuit for outputting a first signal when the reverse light is powered once during the predetermined period of time and for outputting a second signal when the reverse light is powered twice during the predetermined period of time.

9. The backup alarm controller according to claim 8, wherein the control circuit comprises a flip-flop.

10. The backup alarm controller according to claim 8, wherein the second circuitry comprises a transistor which supplies power to the backup alarm when the first signal is output by the first circuitry and which cuts off power to the backup alarm when the second signal is output by the first circuitry.

11. The backup alarm controller according to claim 7, wherein the first circuitry comprises a switching control circuit which is open when the reverse light is powered once during the predetermined period of time and which is closed when the reverse light is powered twice during the predetermined period of time.

12. The backup alarm controller according to claim 11, wherein the second circuitry comprises a transistor which supplies power to the backup alarm when the switching control circuit is closed and which cuts off power to the backup alarm when the switching control circuit is open.

13. A backup alarm to be used in a vehicle comprising:

an input to a reverse light of the vehicle;

first circuitry for determining a number of times that the reverse light is powered within a predetermined period of time; and second circuitry for controlling whether a backup alarm warning is issued based on the number of times that the reverse light is powered within the predetermined period of time as determined by the first circuitry, such that if the reverse light is powered a first predetermined number of times during the predetermined period of time., the backup alarm is powered up when the reverse light is powered, and if the reverse light is powered a second predetermined number of times during the predetermined period of time, the backup alarm is not powered up when the reverse light is powered.

14. The backup alarm according to claim 13, wherein the first circuitry comprises a control circuit for outputting a first signal when the reverse light is powered once during the predetermined period of time and for outputting a second signal when the reverse light is powered twice during the predetermined period of time.

15. The backup alarm according to claim 14, wherein the control circuit comprises a flip-flop.

16. The backup alarm according to claim 14, wherein the second circuitry comprises a transistor which allows issuing of the alarm warning when the first signal is output by the first circuitry and which prevents issuing of the alarm warning when the second signal is output by the first circuit means.

17. The backup alarm according to claim 13, wherein the first circuitry comprises a switching control circuit which is open when the reverse light is powered once during the predetermined period of time and which is closed when the reverse light is powered twice during the predetermined period of time.

18. The backup alarm according to claim 17, wherein the second circuitry comprises a transistor which allows issuing of the alarm warning when the switching control circuit is closed and which prevents issuing of the alarm warning when the switching control circuit is open.

* * * * *